(12) United States Patent
Lee

(10) Patent No.: US 9,771,010 B2
(45) Date of Patent: Sep. 26, 2017

(54) DRIVING DEVICE FOR VERTICALLY MOVABLE WAIST BAR OF VEHICLE

(71) Applicant: Hyundai Motor Company, Seoul (KR)

(72) Inventor: Hyun-Woo Lee, Jeollabuk-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/005,347

(22) Filed: Jan. 25, 2016

(65) Prior Publication Data

US 2017/0101043 A1 Apr. 13, 2017

(30) Foreign Application Priority Data

Oct. 13, 2015 (KR) ........................ 10-2015-0142975

(51) Int. Cl.
*B60J 1/20* (2006.01)
*B60N 3/02* (2006.01)
*B60J 5/04* (2006.01)
*B60J 1/17* (2006.01)

(52) U.S. Cl.
CPC ............ *B60N 3/023* (2013.01); *B60J 1/2094* (2013.01); *B60J 5/0426* (2013.01); *B60J 1/17* (2013.01); *B60J 5/04* (2013.01)

(58) Field of Classification Search
CPC . B60J 5/04; B60J 5/0411; B60J 5/0426; B60J 5/0486; B60J 1/17; B60J 1/2094; B60N 3/00; B60N 3/02; B60N 30/23; B60N 3/026; E05F 15/423; E05F 15/67; E05F 15/689; E05B 1/0046
USPC .......................... 296/146.5, 146.6, 152; 49/65
See application file for complete search history.

(56) References Cited

U.S. PATENT DOCUMENTS

| 1,986,700 | A | * | 1/1935 | Zimmerman | B60J 1/2011 160/37 |
| 2,115,632 | A | * | 4/1938 | Hanley | E05F 11/382 49/348 |
| 4,744,172 | A | * | 5/1988 | Miyauchi | E05F 11/423 49/349 |
| 4,930,255 | A | * | 6/1990 | Sea | B60J 1/17 49/349 |

(Continued)

FOREIGN PATENT DOCUMENTS

| JP | 02-148817 U | 6/1990 |
| JP | 05-085172 A | 4/1993 |

(Continued)

*Primary Examiner* — Katherine Mitchell
*Assistant Examiner* — Abe Massad
(74) *Attorney, Agent, or Firm* — Mintz Levin Cohn Ferris Glovsky and Popeo, P.C.; Peter F. Corless

(57) ABSTRACT

A driving device for a vertically movable waist bar of a vehicle is provided. The driving device enables the waist bar to be moved vertically in conjunction with the door glass to ensure the driver's vision by eliminating an invisible area created by the waist bar, and also to increase available indoor space. The driving device includes a transfer unit that is coupled to the waist bar mounted at a vehicle door and configured to be movable vertically, and a power transmission unit that is connected at a first side thereof to the transfer unit and at a second side thereof to a drive unit to transmit power generated from the drive unit to the transfer unit. Additionally, the waist bar is moved vertically in response to the vertical movement of the transfer unit.

3 Claims, 13 Drawing Sheets

(56) References Cited

U.S. PATENT DOCUMENTS

| | | | | |
|---|---|---|---|---|
| 6,560,929 | B1* | 5/2003 | Staser | E05F 11/423 |
| | | | | 49/349 |
| 6,820,370 | B2* | 11/2004 | Marscholl | B60J 1/17 |
| | | | | 49/352 |
| 6,966,149 | B2* | 11/2005 | Fenelon | E05F 11/385 |
| | | | | 49/349 |
| 7,213,370 | B2* | 5/2007 | Dedrich | E05F 11/382 |
| | | | | 49/358 |
| 8,443,552 | B2 | 5/2013 | Kinoshita et al. | |
| 2007/0120394 | A1 | 5/2007 | Nakamori et al. | |
| 2010/0107501 | A1* | 5/2010 | Iimori | E05F 11/423 |
| | | | | 49/349 |
| 2014/0103683 | A1* | 4/2014 | Giddens | B60J 1/2094 |
| | | | | 296/152 |

FOREIGN PATENT DOCUMENTS

| | | |
|---|---|---|
| JP | 06-272448 A | 9/1994 |
| JP | 2012-162233 | 8/2012 |
| KR | 10-0526807 | 10/2005 |

* cited by examiner

DRIVING DEVICE FOR VERTICALLY MOVABLE WAIST BAR OF VEHICLE

CROSS-REFERENCE TO RELATED APPLICATION

This application claims the priority benefit of Korean Patent Application No. 10-2015-0142975, filed on Oct. 13, 2015 in the Korean Intellectual Property Office, the disclosure of which is incorporated herein by reference.

BACKGROUND

1. Field of the Invention

The present invention relates to a driving device for a vertically movable waist bar of a vehicle, and more particularly, to a driving device for a waist bar, which enables the waist bar to be moved vertically in linkage with the door glass of a vehicle, thereby ensuring the driver's vision by eliminating a blind spot created by the waist bar, and also increasing available indoor space.

2. Description of the Related Art

Conventionally, a truck is larger sized vehicle than a sedan, and thus has many blind spots in which a driver has difficulty in securing vision while driving. In particular, trucks have many lateral blind spots due to the large width of truck seats. The occurrence of blind spots is one of the factors that deteriorate driving safety.

In the related art, to solve the problem described above, a method of reducing blind spots by increasing the size of the door glass of the truck has been developed. However, in implementing such a strategy for varying sizes of trucks, the door glass may not be completely inserted into the door of the vehicle when the door glass is moved down. More specifically, since the door glass may not be completely inserted into the door of the vehicle (e.g., fit or be accommodated into the door due to size restrictions when the window is lowered) even in the lowermost position thereof, an upper end portion of the door glass remains protruding out of the vehicle door. Thus, when the driver drives the vehicle, the door glass is at risk of breakage, thereby representing a potential cause of injury. As a countermeasure for the above problem, a waist bar is installed near the door belt line of the vehicle, to prevent breakage of the door glass. However, the conventional waist bar causes restriction of the driver's vision and reduced space inside the vehicle.

The present invention has been devised to solve the problems described above, and serves to ensure the driver's vision and the efficient use of space by allowing the waist bar to be moved vertically.

SUMMARY

Therefore, the present invention provides a driving device for a waist bar of a vehicle, which is manufactured to move the waist bar vertically in linkage (e.g., in conjunction) with the door glass of the vehicle, thereby ensuring the driver's vision in varying sized trucks, the efficient use of space inside the vehicle, and the safety of passengers by preventing breakage of the door glass. Technical objects to be achieved by the present invention are not limited to those mentioned above, and other objects may be clearly understood by those skilled in the art from the description given below.

In accordance with the present invention, the above and other objects can be accomplished by the provision of a driving device for a waist bar of a vehicle, the driving device may include a transfer unit coupled to the waist bar disposed at a vehicle door and configured to be movable vertically, and a power transmission unit connected at one side thereof to the transfer unit and at the other side thereof to a drive unit, to transmit power generated from the drive unit to the transfer unit, wherein the waist bar may be moved vertically in response to the upward and downward movement of the transfer unit.

The drive unit may be a window motor configured to vertically move a door glass of the vehicle, and the waist bar may be moved vertically in a direction opposite to a direction in which the door glass is moved via driving of the window motor. The transfer unit may include a pair of carriers inserted respectively into both distal ends of the waist bar to be moved vertically together with the waist bar, and a pair of rails coupled to an inner door panel to correspond to positions of the carriers, the rails being configured to accommodate the carriers in a sliding manner.

The transfer unit may further include a connection bar having both distal ends coupled to the respective carriers, and a rack gear having an upper end coupled to the connection bar, the rack gear being configured to convert rotational motion of the drive unit into linear motion to vertically move the connection bar. The power transmission unit may include a gear-belt connected to the drive unit via a belt to be rotated, and a pinion gear engaged with the gear-belt and the rack gear, the pinion gear being rotated in a direction opposite to a rotation direction of the drive unit.

The gear-belt may include a first gear part connected to the belt, and a second gear part engaged with the pinion gear to rotate the pinion gear. The driving device may further include a bracket coupled to the inner door panel, wherein the gear-belt and the pinion gear may be rotatably coupled to the bracket, and the rack gear may be vertically movably coupled to the bracket.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
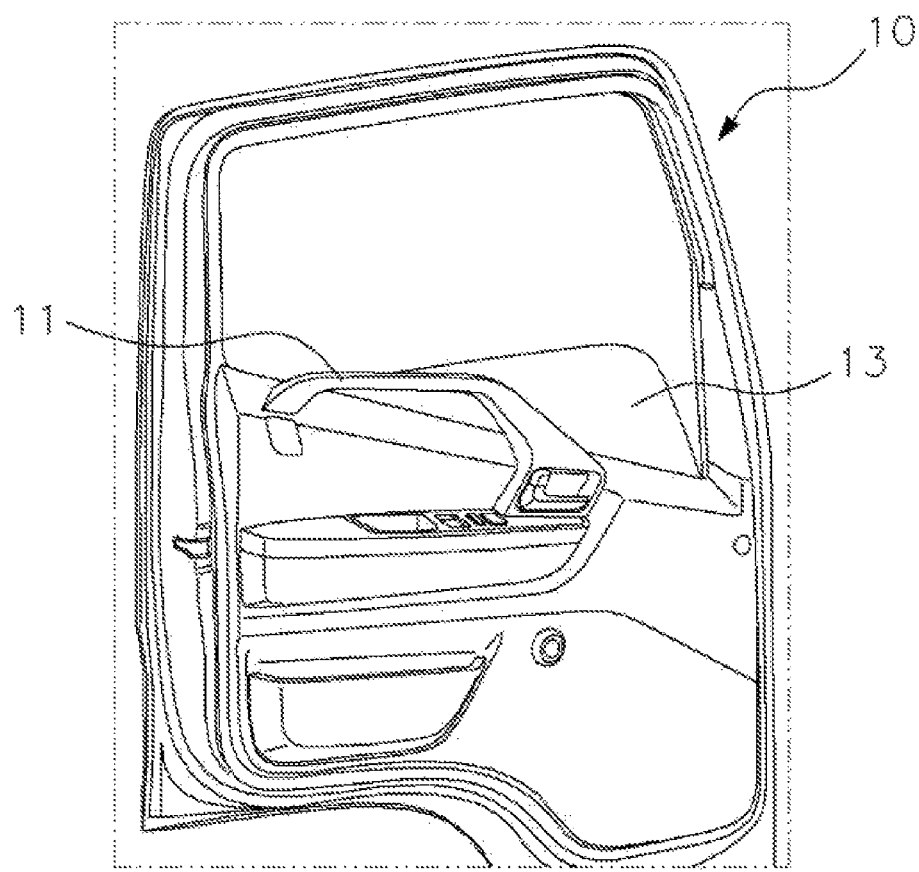
FIG. 1 is a view illustrating a door of a vehicle and a waist bar coupled to the door according to the related art.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, a driving device for a vertically movable waist bar of a vehicle according to the present invention, devised to solve the problems of the related art, will be described in detail. The terms or words used in the specification and claims of the present invention are not interpreted using typical or dictionary limited meanings, and are constructed as meanings and concepts conforming to the technical sprit of the present invention based on the principle that the inventors can appropriately define the concepts of the terms to explain the present invention in the best manner. Accordingly, it is to be understood that the detailed description, which will be disclosed along with the accompanying drawings, is intended to describe the exemplary embodiments of the present invention and is not intended to represent all technical ideas of the present invention. Therefore, it should be understood that various equivalents and modifications can exist which can replace the exemplary embodiments described in the time of the application.

Conventionally, in the case of commercial vehicles (e.g., trucks) in contrast with sedans, it has been difficult to ensure the driver's vision from the driver's seat of the vehicle due to the large size of commercial vehicles. Generally, the above problem has been solved by a method of enlarging the door glass and the windshield of the vehicle. The enlargement of the windshield of the vehicle causes no breakage of the windshield due to the driver's carelessness since the windshield is fixed, whereas the door glass may be broken by the carelessness of the driver or a passenger sitting in the passenger's seat. To solve this problem, in the related art, a waist bar 11 has been installed to prevent shock from being applied to the protruding portion of the door glass 13.

Figure 2:
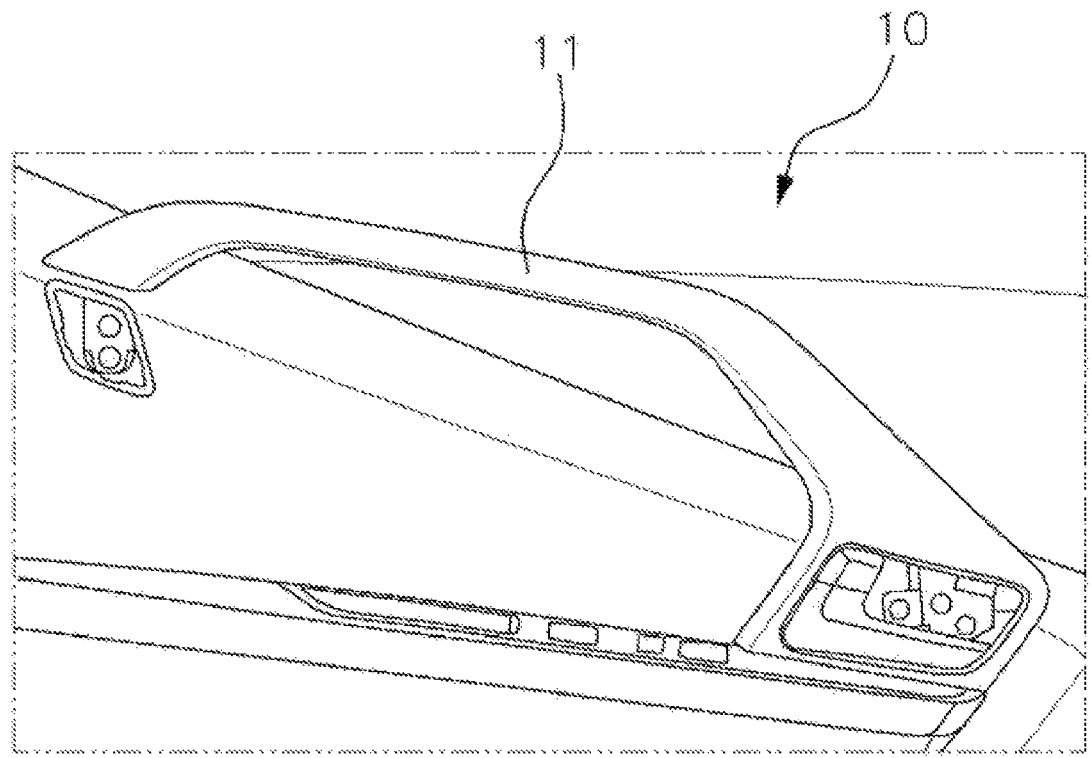
FIG. 2 is an enlarged view of the waist bar coupled to the door of the vehicle according to the related art.

FIG. 1 is a view illustrating a door 10 of a vehicle and the waist bar 11 coupled to the door 10 according to the related art. As seen in FIG. 1, the door glass 13 of varying sized trucks is larger than the door 10 of the vehicle (e.g., a sedan), and thus cannot be completely inserted into the door 10 of the vehicle. Accordingly, it will be appreciated that the waist bar 11 is provided to prevent the door glass of the vehicle from receiving shock due to the carelessness of the driver. FIG. 2 is an enlarged view of the waist bar 11 coupled to the door 10 of the vehicle according to the related art. As seen in FIG. 2, the waist bar 11 is coupled to the door 10 of the vehicle using bolts to be mounted to the door 10.

In particular, by coupling the waist bar 11 to the door 10 of the vehicle via the method described above, shock attributable to the carelessness of the driver is first transmitted to the waist bar 11 before being applied to the door glass 13. This may prevent shock from being applied to the door glass 13, consequently preventing breakage of the door glass 13 and protecting the driver and the passenger from injury due to glass fragments. However, the following problem occurs when the waist bar 11 is mounted as illustrated in FIG. 1.

The waist bar serves to prevent breakage of the upper end portion of the door glass, which protrudes out of the door since the door glass is not completely inserted into the door, and therefore, the waist bar is unnecessary when the door window is closed. However, when the waist bar is fastened to the door via bolts, the waist bar is fixed at a constant position regardless of the position of the door glass. When the vehicle is driven and the waist bar is at the fixed position as illustrated in FIG. 1, the waist bar blocks the driver's view to the side of the vehicle. Therefore, the waist bar blocks the side view when the driver intends to change the lanes, thereby deteriorating downward lateral visibility. In addition, since the waist bar is fastened via bolts as illustrated in FIG. 2 and is fixed at a constant position, the waist bar occupies a substantial amount of space of the vehicle even when the waist bar is unnecessary, which may prevent the efficient use of space inside the vehicle and may deteriorate the riding comfort of the driver and the passenger.

The present invention is devised to solve the problems described above, and provides a driving device for a vertically movable waist bar, configured to move the waist bar upward when the door glass is moved downward and move the waist bar downward when the door glass is moved upward when a drive unit thereof is used as a window motor of the vehicle, thereby reducing the driver's blind spot by minimizing protrusion of the waist bar upon the upward movement of the door glass, to thus ensure the driver's vision and the riding comport of the driver.

According to one aspect of the present invention, the driving device may include a transfer unit, coupled to the waist bar disposed (e.g., mounted) at the door of the vehicle to be movable upward and downward (e.g., vertically), a power transmission unit connected at one side thereof (e.g., a first side) to the transfer unit and at the other side thereof (e.g., a second side) to a drive unit to transmit power generated from the drive unit to the transfer unit, and the drive unit connected to the power transmission unit to generate power.

Figure 3:
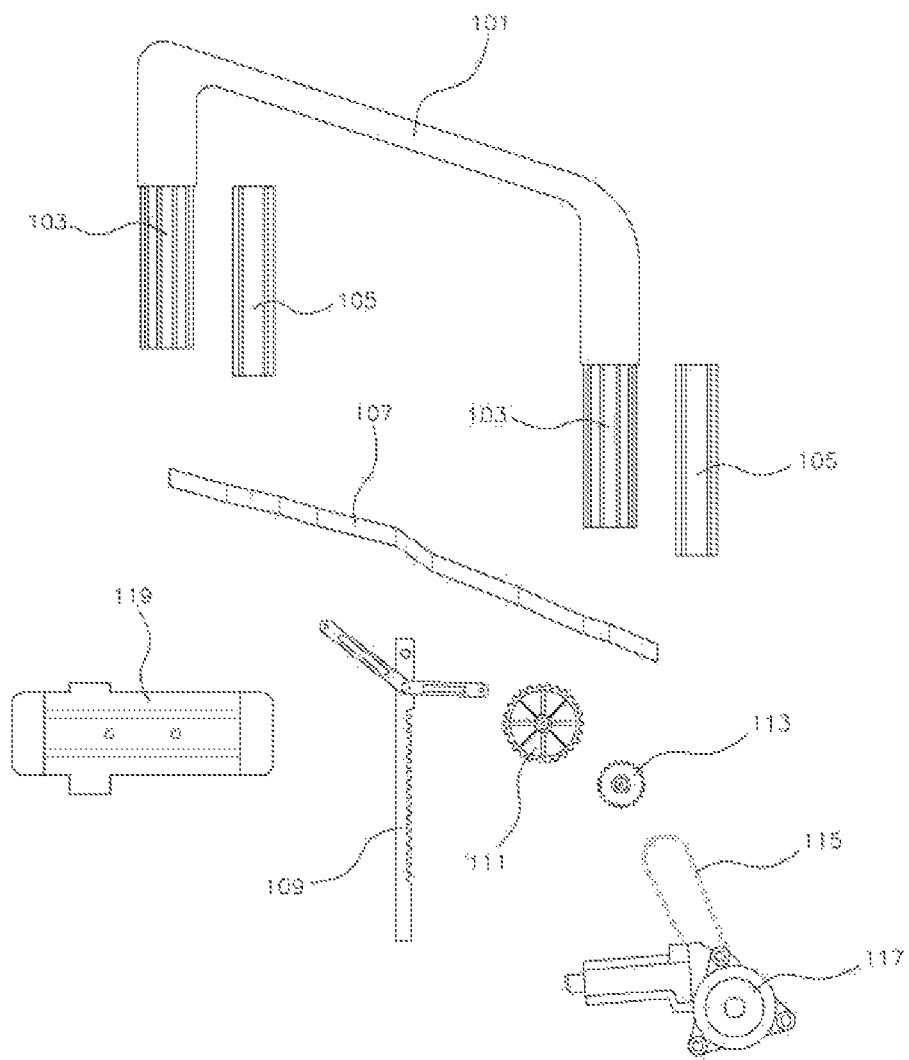
FIG. 3 is a detailed view of constituent elements of a driving device for a vertically movable waist bar according to one exemplary embodiment of the present invention.

FIG. 3 is a detailed view of constituent elements of the driving device for the vertically movable waist bar according to one exemplary embodiment of the present invention. The waist bar 101 of the present invention serves to prevent breakage of the door glass by being moved upward when the door glass 13 is moved downward. The transfer unit may include carriers 103, rails 105, a connection bar 107, and a rack gear 109, and the power transmission unit may include a pinion gear 111, a gear belt 113, and a belt 115. The drive unit 117 may be a window motor.

More specifically, the roles of the respective constituent elements of the present invention will be described. The waist bar 101 of the present invention serves to prevent breakage of the protruding portion of the door glass 13, which is not inserted into the door in the lowermost position of the door glass 13. The carriers 103 may be inserted into both distal ends of the waist bar 101, and may be configured to move the waist bar 101 vertically along the rails 105. The rails 105 may accommodate the carriers 103 in a sliding manner, and may be configured to guide the vertical movement of the waist bar 101. The connection bar 107 may be connected at both distal ends thereof to the respective carriers 103, and may be configured to transmit the linear motion of the rack gear 109 to the carriers 103.

Further, the rack gear 109 may be connected at an upper end thereof to the connection bar 107, and may be configured to convert the rotational motion of the drive unit 117 or the rotational motion of the pinion gear 111 into linear motion to move the connection bar 107 vertically. The pinion gear 111 of the present invention is engaged with the rack gear 109, and may be configured to rotate the rack gear 109 in the direction opposite to the direction in which the drive unit 117 is rotated. The gear-belt 113 may include a first gear part connected to the belt 115 and a second gear part engaged with the pinion gear 111 to rotate the pinion gear 111, and may be configured to transmit power from the drive unit 117 to the pinion gear 111.

Further, the belt 115 may be connected to the drive unit 117 and the gear-belt 113, and may be configured to transmit power from the drive unit 117 to the gear belt 113. The drive unit 117 may be a window motor configured to transmit power to the transfer unit via the belt 115. In the present invention, a bracket 119 may be coupled to an inner door panel 201 to secure the power transmission unit to the inner door panel 201. Accordingly, the gear-belt 113 and the pinion gear 111 may be rotatably coupled to the bracket 119, and the rack gear 119 may be vertically movably coupled to the bracket 109.

Figure 4:
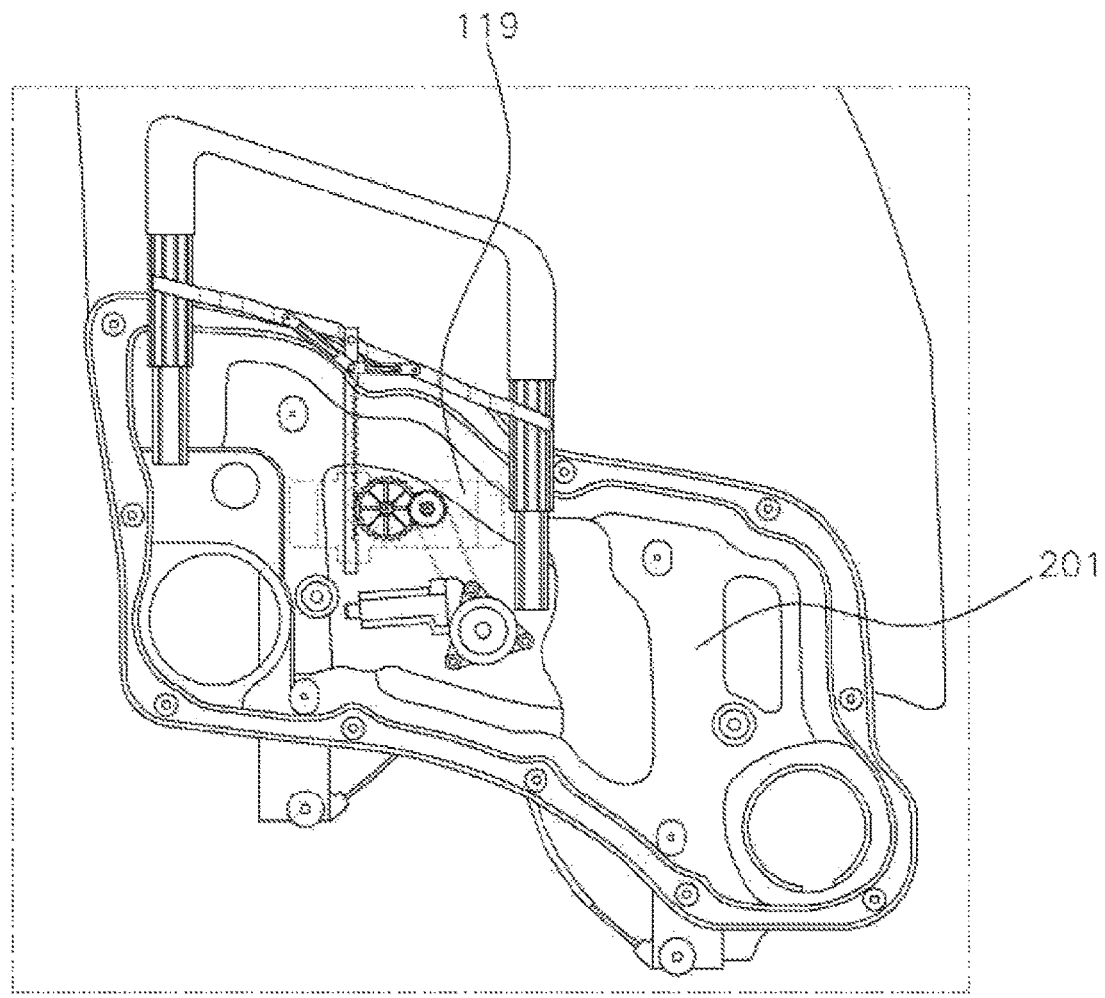
FIG. 4 is a view illustrating a state in which the driving device for the vertically movable waist bar is coupled to a vehicle door according to one exemplary embodiment of the present invention.

FIG. 4 is a view illustrating a coupled state of the driving device for the vertically movable waist bar including the respective constituent elements described above and the door of the vehicle according to one exemplary embodiment of the present invention. In FIG. 4, the waist bar is coupled to the inner door panel 201 via the bracket 119, to which the gear-belt and the pinion gear may be rotatably coupled and the rack gear may be vertically movably coupled.

Figure 5:
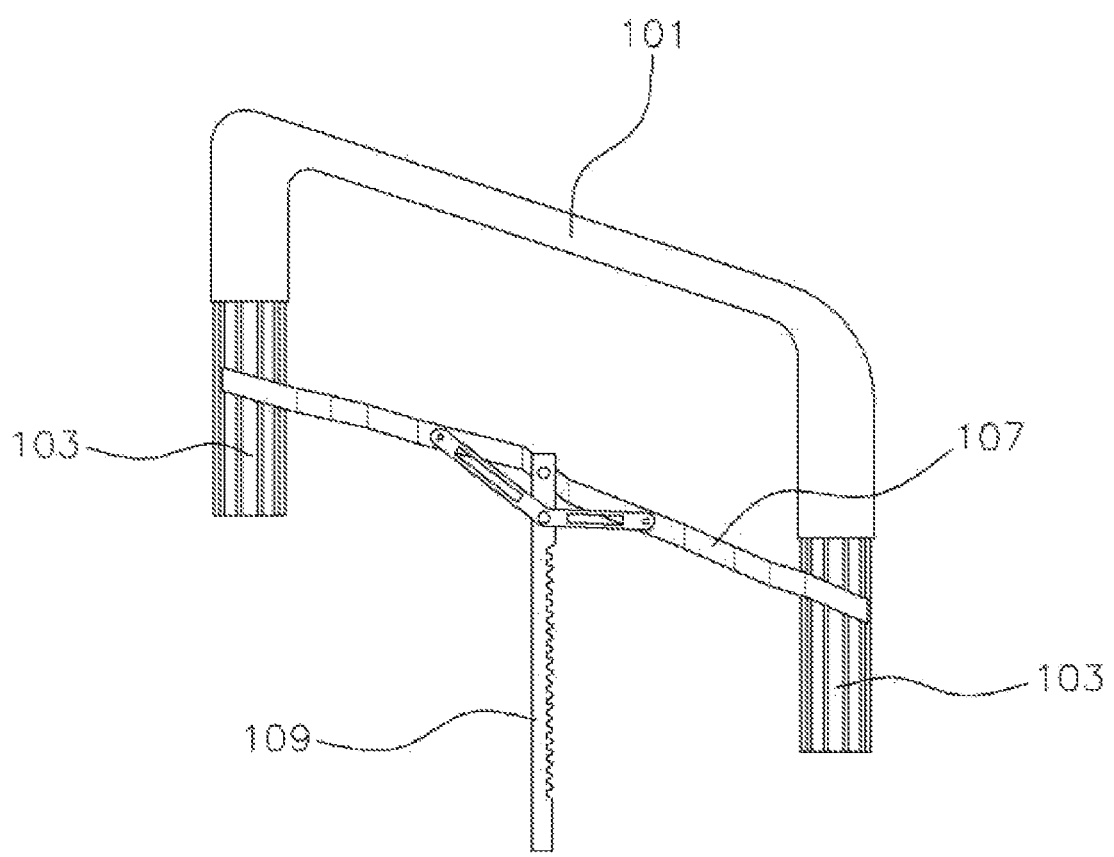
FIG. 5 is a view illustrating a coupled state of a waist bar, a carrier, a connection bar, and a rack gear according to one exemplary embodiment of the present invention.

Further, the coupling relationships between the waist bar and the respective constituent elements will be described. FIG. 5 is a view illustrating a coupled state of the waist bar 101, the carriers 103, the connection bar 107, and the rack gear 109 according to one exemplary embodiment of the present invention. The waist bar may be altered in various ways based on vehicle types for the protection of the door glass 13. As shown in FIG. 5, the carriers 103 may be inserted into both distal ends of the waist bar 101 to be movable upward and downward on the rails 105. In addition, both distal ends of the connection bar 107 may be coupled to the respective carriers 103. An upper end of the rack gear 109 may be connected to the connection bar 107 to constitute a portion of the transfer unit.

Figure 6:
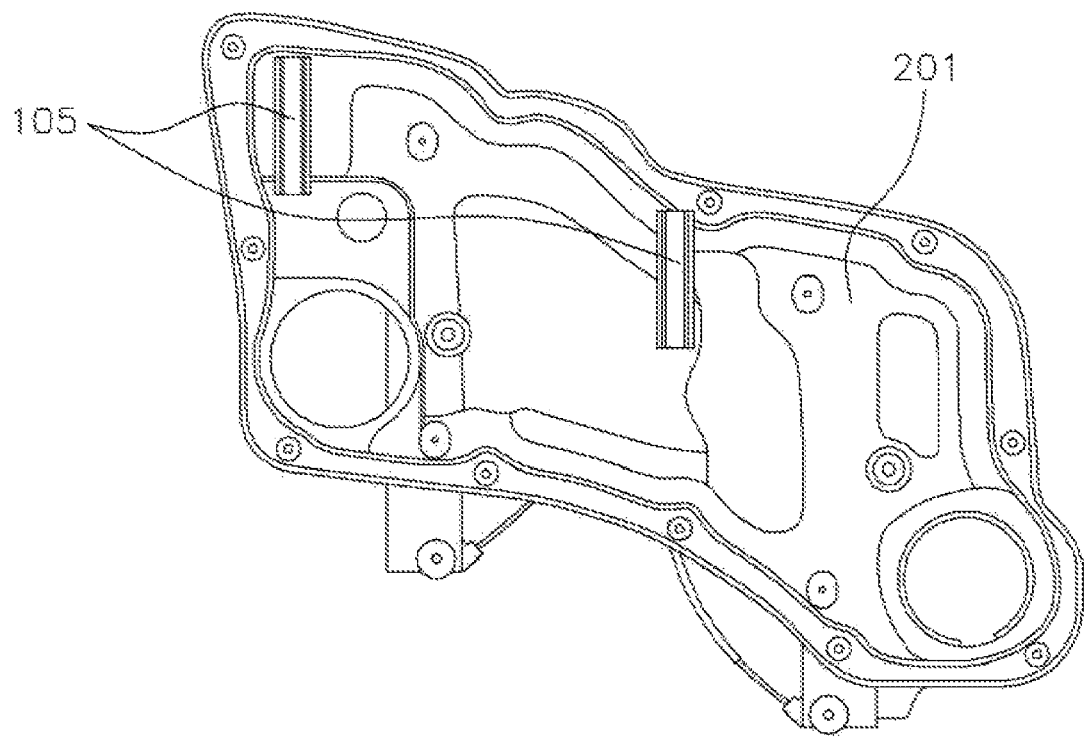
FIG. 6 is a view illustrating a coupled state of a door inner panel and a rail according to one exemplary embodiment of the present invention.

FIG. 6 is a perspective view illustrating a coupled state of the inner door panel 201 and the rails 105 according to one exemplary embodiment of the present invention. The rails 105 may be secured (e.g., fixed), at given positions, to the inner door panel 201 via fastening elements, to guide the vertical movement of the waist bar 101. Thus, the waist bar 101 may be movable upward and downward to given positions on the rails 105, to which a portion of the transfer unit illustrated in FIG. 5 is secured.

Figure 7:
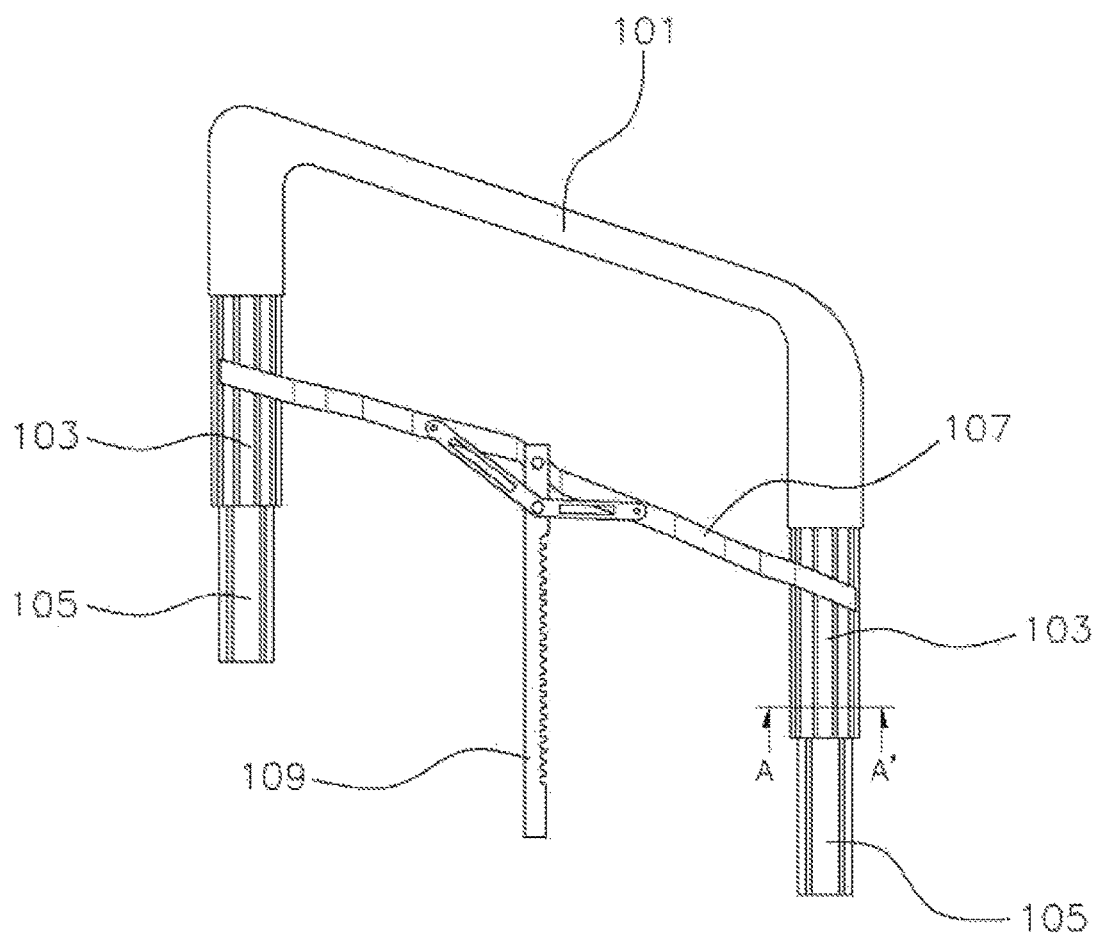
FIG. 7 is a view illustrating a coupled state of the waist bar, the carrier, the connection bar, the rack gear, and the rail according to one exemplary embodiment of the present invention.
Figure 8:
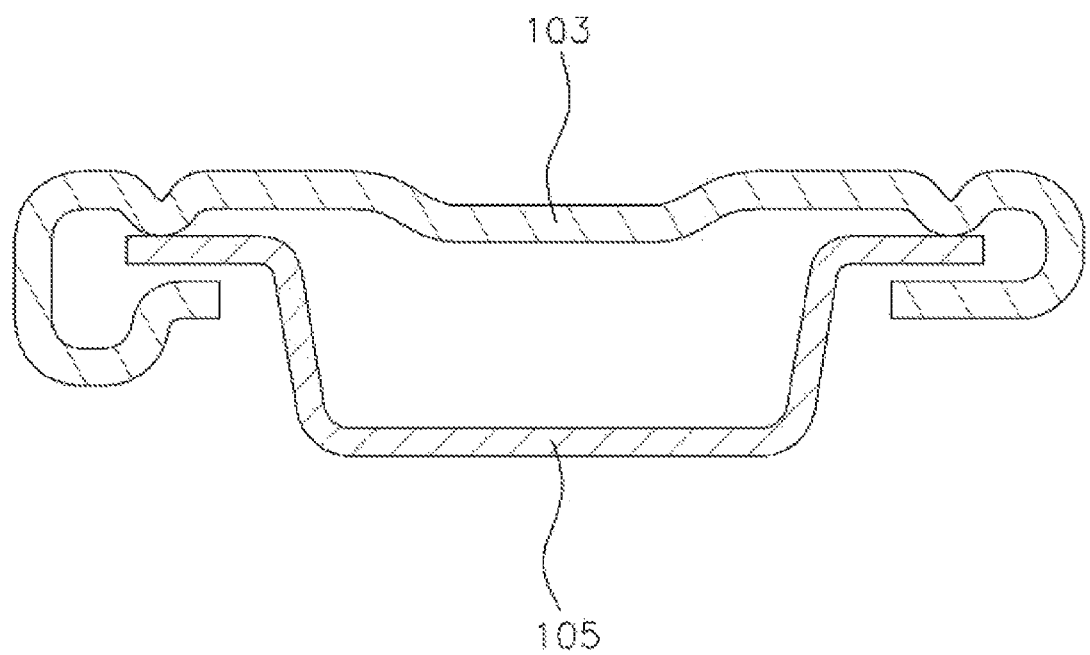
FIG. 8 is a sectional view illustrating a state in which the rail is received in the carrier according to one exemplary embodiment of the present invention.

FIG. 7 is a perspective view illustrating a coupled state of the waist bar and the transfer unit according to one exemplary embodiment of the present invention. As shown in FIG. 7, a first side of the carriers 103 may be mounted in the rails 105 in a sliding manner. More specifically, FIG. 8 is a sectional view taken along line A-A' of FIG. 7. As shown in FIG. 8, the rail 105, fixed to the inner door panel, may be disposed in the carrier 103, to allow the carrier 103 to slide thereon without a risk of separation. In addition, the rail may have any shape in which the carrier may be accommodated in the rail in a sliding manner without a risk of separation.

Figure 9:
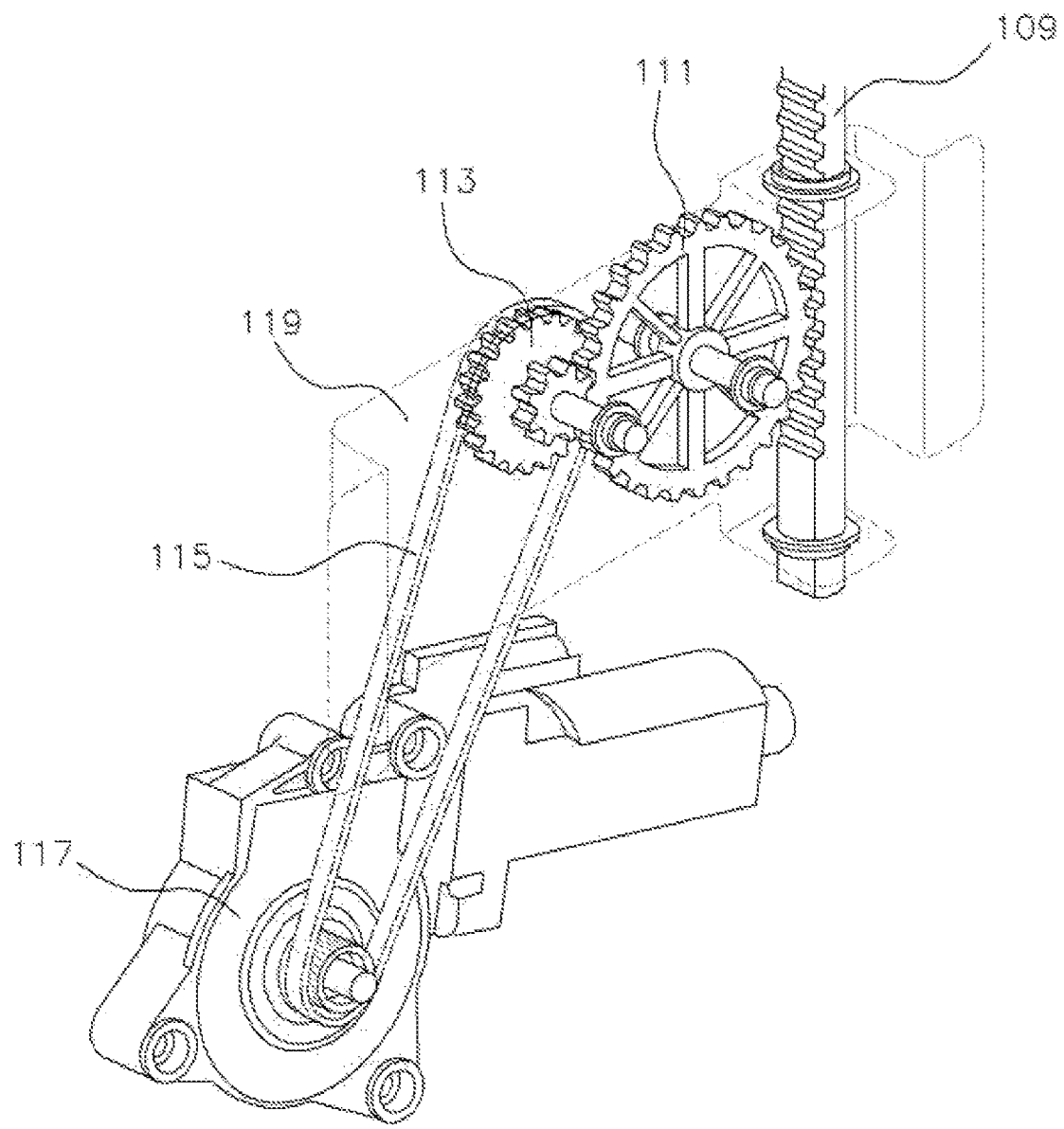
FIG. 9 is a view illustrating a coupling relationship between the rack gear, a power transmission unit, and a drive unit according to one exemplary embodiment of the present invention.

FIG. 9 is a view illustrating a coupled state of the rack gear 109, the power transmission unit, and the drive unit 117 according to one exemplary embodiment of the present invention. The drive unit 117 may be a window motor. The waist bar may be adapted to be moved in the direction opposite to the direction in which the door glass is moved, to be inserted into the vehicle door when the waist bar is not required, which may improve the driver's vision and the riding comfort of the driver. Further, the power transmission unit may include the belt 115, the gear-belt 113, and the pinion gear 111.

Particularly, the gear-belt 113 may be connected to the drive unit 117 via the belt 115, to be rotated. The pinion gear 111 may be engaged with the gear-belt 113 and the rack gear 109, and may be rotated in the direction opposite to the rotation direction of the drive unit 117. In addition, the gear-belt 113 may include the first gear part connected to the belt 115 and the second gear part engaged with the pinion gear 111 to rotate the pinion gear 111. The power transmission unit may further include the bracket 119 coupled to the inner door panel, the gear-belt 113 and the pinion gear 111 being rotatably coupled to the bracket 119, and the rack gear 109 being vertically movably coupled to the bracket 119.

Figure 10:
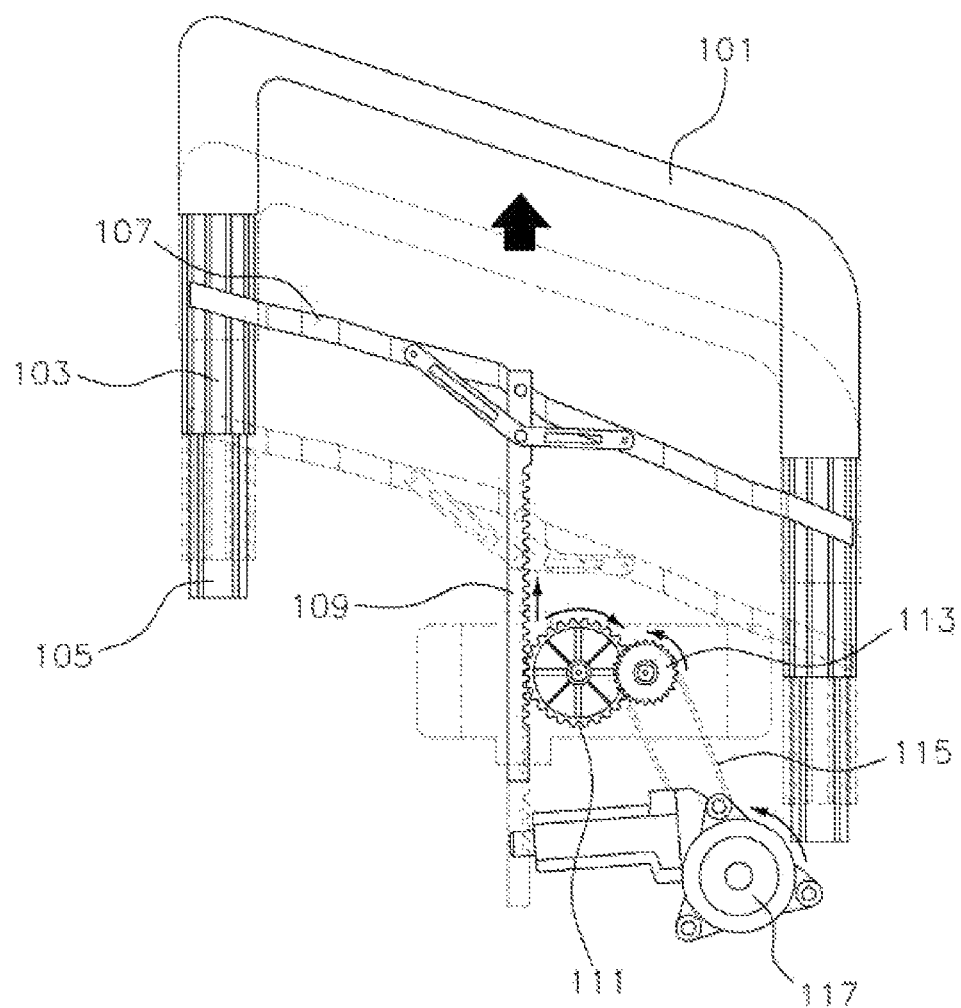
FIG. 10 is a view illustrating the upward driving principle of the driving device for the vertically movable waist bar according to one exemplary embodiment of the present invention.
Figure 11:
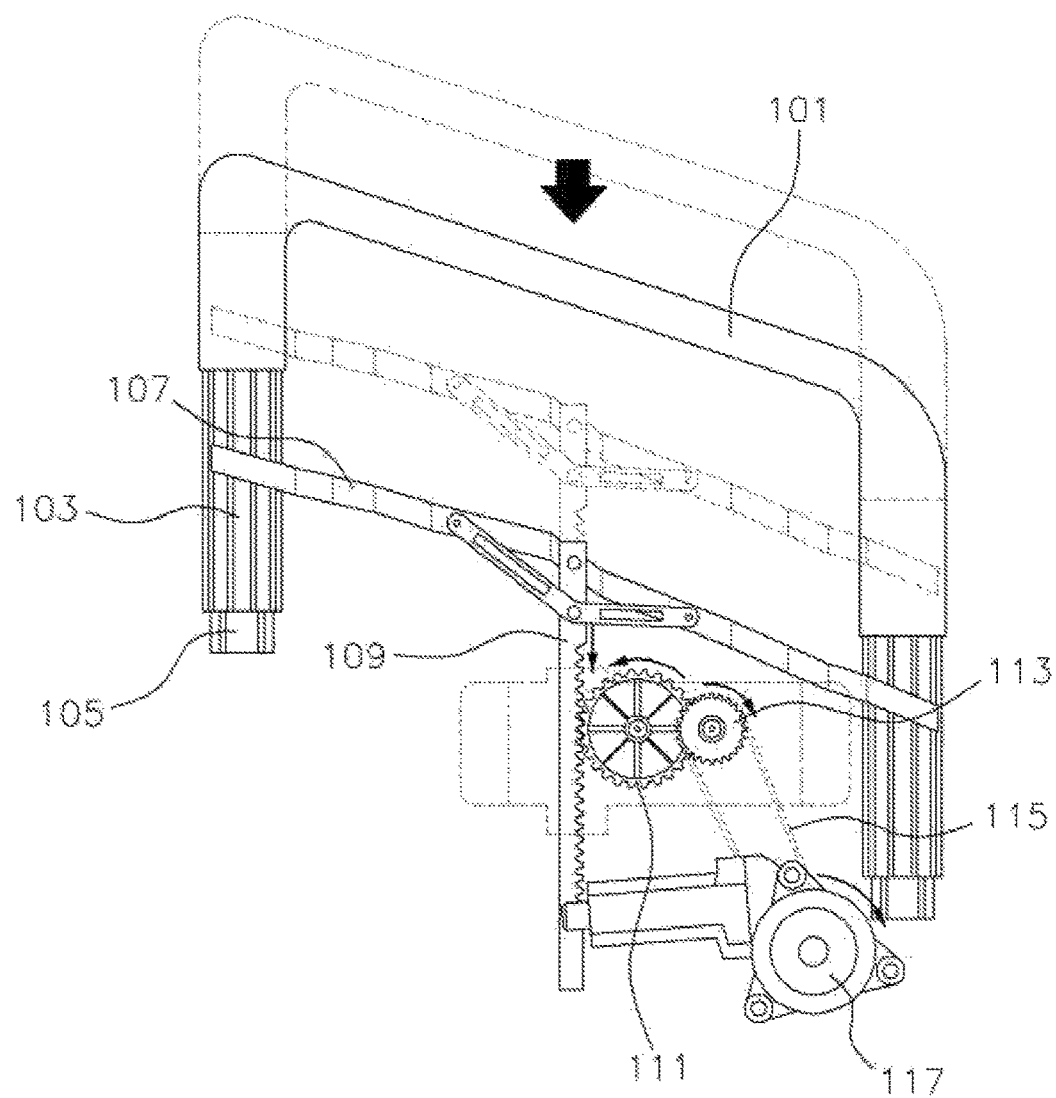
FIG. 11 is a view illustrating the downward driving principle of the driving device for the vertically movable waist bar according to one exemplary embodiment of the present invention.

FIGS. 10 and 11 are views illustrating the driving principle of the driving device for the vertically movable waist bar according to one exemplary embodiment of the present invention. FIG. 10 is a view illustrating the upward motion of the waist bar, and FIG. 11 is a view illustrating the downward motion of the waist bar.

In FIG. 10, when the drive unit 117 is rotated counterclockwise, the belt 115 may also be rotated counterclockwise to transmit power to the first gear part of the gear-belt 113. Then, as the second gear part of the gear-belt 113 is engaged with the pinion gear 111, the pinion gear 111 may be rotated clockwise to transmit power. In conclusion, the rack gear 109 connected to the pinion gear 111 may be moved linearly to move the transfer unit and the waist bar upward.

On the other hand, in FIG. 11, when the drive unit 117 is rotated clockwise, the belt 115 may also be rotated clockwise to transmit power to the first gar part of the gear-belt 113. Then, as the second gear part of the gear-belt 113 is engaged with the pinion gear 111, the pinion gear 111 may be rotated counterclockwise to transmit power. In conclusion, the rack gear 109 connected to the pinion gear 111 may be moved linearly to move the transfer unit and the waist bar downward.

Figure 12:
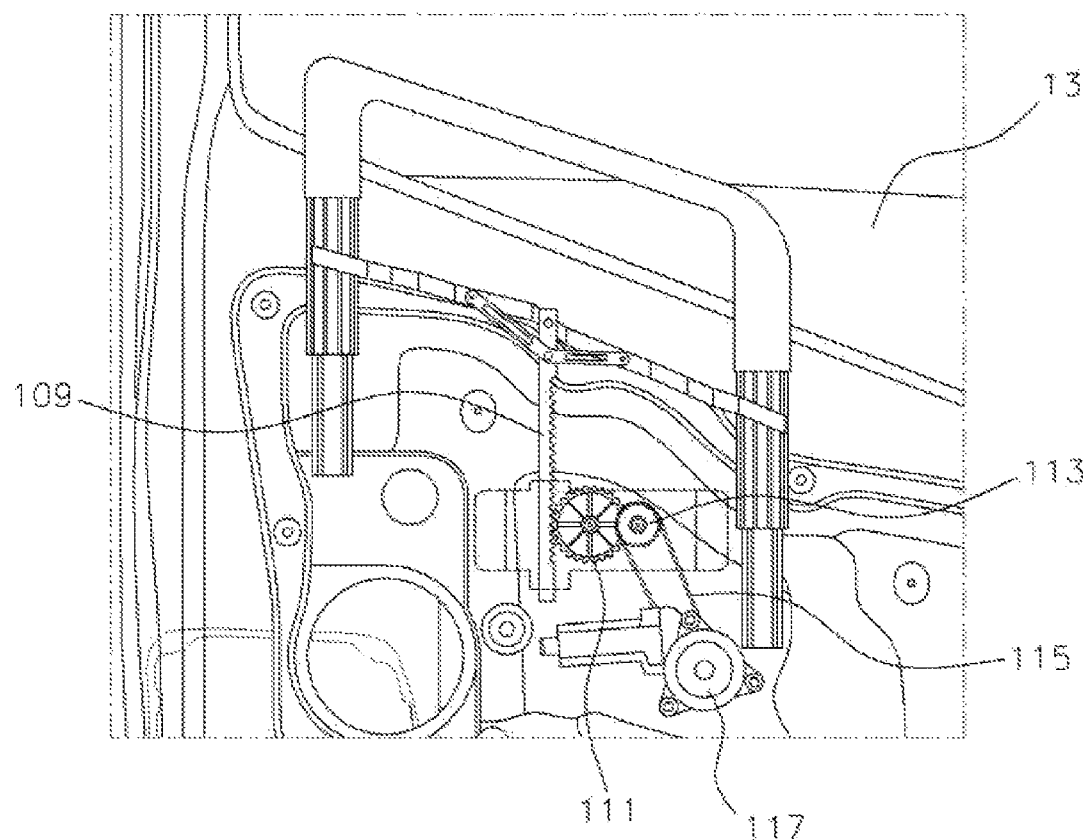
FIG. 12 is a use state view illustrating an operation in which the waist bar is moved upward when the door glass is moved downward and the drive unit is used as a window motor according to one exemplary embodiment of the present invention.
Figure 13:
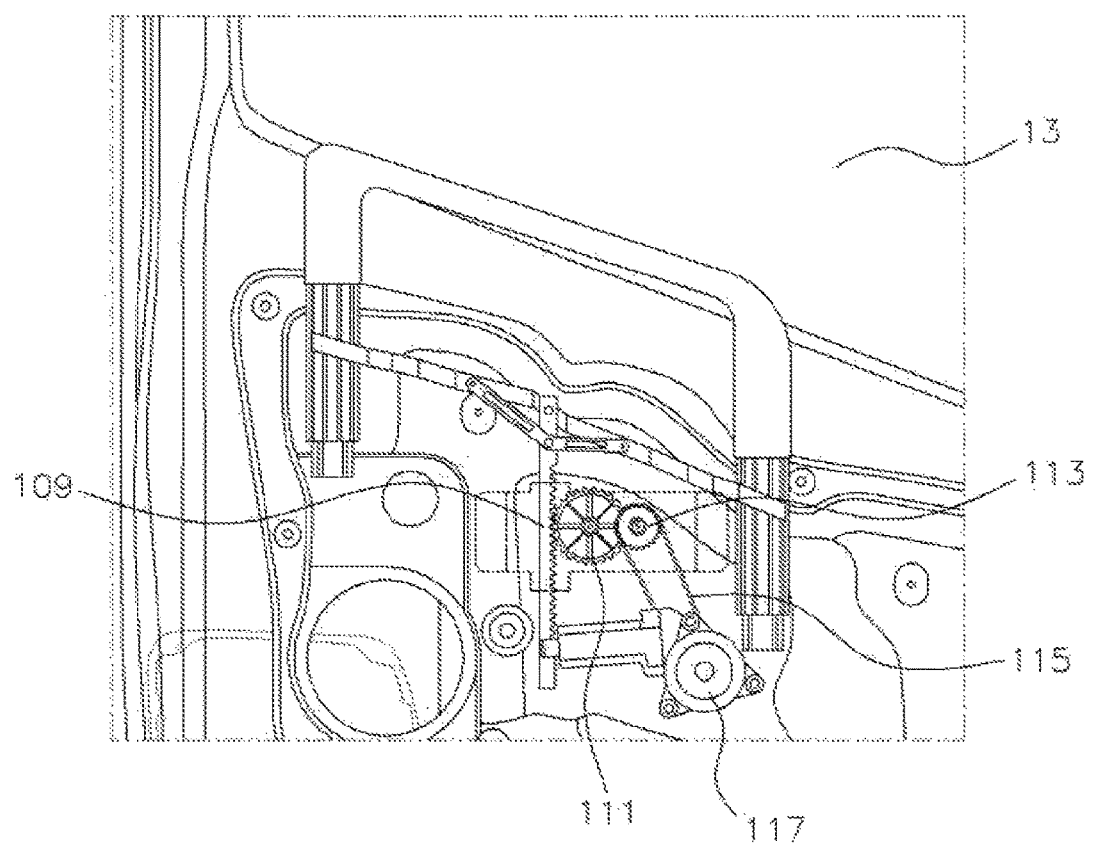
FIG. 13 is a use state view illustrating an operation of the door glass and the waist bar when the drive unit is used as a window motor according to one exemplary embodiment of the present invention.

The drive unit 117 may be a window motor to allow the waist bar to be moved upward when the door glass is moved downward and to be moved downward when the door glass is moved upward. FIGS. 12 and 13 are use state views illustrating the operation of the door glass and the waist bar when the window motor is used as the drive unit according to one exemplary embodiment of the present invention.

In particular, as illustrated in FIG. 12, when the window motor is rotated counterclockwise, the door glass 13 may be moved downward and inserted into the door. At this time, the belt 115 connected to the window motor may be rotated counterclockwise in the same manner as the window motor, and may be configured to transmit power to the gear belt 113 to rotate the gear-belt 113. Additionally, the gear-belt 113 may be engaged with the pinion gear 111, thus converting the counterclockwise rotation into clockwise rotation of the pinion gear 111. Then, the rotation motion of the pinion gear 111 may be converted into the linear upward motion of the rack gear 109 linked to the pinion gear 111. Accordingly, the rack gear 109 may be configured to move the carriers 103 and the waist bar 101 upward via the connection bar 107. In conclusion, the door glass, a portion of which is exposed out of the door, may be protected by the protruding waist bar, thereby preventing breakage of the door glass due to the carelessness of the driver.

Moreover, as illustrated in FIG. 13, when the window motor is rotated counterclockwise, the door glass 13 may be moved upward to protrude out of the door. At this time, the belt 115 connected to the window motor may be rotated clockwise in the same manner as the window motor, and may be configured to transmit power to the gear belt 113 to rotate the gear-belt 113. Additionally, the gear-belt 113 may be engaged with the pinion gear 111, thus converting the clockwise rotation into counterclockwise rotation of the pinion gear 111.

Then, the rotation motion of the pinion gear 111 may be converted into the linear downward motion of the rack gear 109 linked to the pinion gear 111. Accordingly, the rack gear 109 may be configured to move the carriers 103 and the waist bar 101 downward via the connection bar 107. In conclusion, when the door glass is moved upward, the protrusion of the waist bar, which is no longer necessary to protect the door glass, may be minimized to reduce the driver's blind slot, which may improve the driver's vision and the riding comfort of the driver via the efficient use of a passenger compartment.

With the use of the driving device for the vertically movable waist bar of the vehicle according to the present invention, it may be possible to prevent deterioration in the driver's vision and the riding comfort of the driver due to a lateral blind spot that is the problem of a conventional waist bar used to protect the door glass. The driving device may locate the waist bar at an appropriate height when the waist bar is required to protect the upwardly moved door glass, which may ensure the safety of the driver and the driver's vision owing to a reduced blind spot.

As is apparent from the above description, a driving device for a vertically movable waist bar of a vehicle according to the present invention enables the manufacture of a waist bar that is vertically movable in linkage with the door of the vehicle, whereby the waist bar is inserted into the door when it is not needed, to reduce blind spots while a driver drives the vehicle. Accordingly, the present invention has the effect of securing the vision of the driver and creating an environment for safe driving.

In addition, the present invention has the effect of preventing breakage of the door glass due to the carelessness of the driver by positioning the waist bar at a protruding upper end portion of the door glass when the door glass is opened, thereby having the effect of preventing injury to the driver, which might otherwise be caused by the breakage of the door glass. The present invention further has the effects of ensuring sufficient space inside the vehicle and improving the riding comfort of the driver by inserting the waist bar into the door when the door glass is completely moved up and the waist bar is unnecessary.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driving device for a waist bar of a vehicle, comprising:
   a transfer unit coupled to the waist bar mounted at a vehicle door, the transfer unit configured to be movable vertically; and
   a power transmission unit connected at a first side thereof to the transfer unit and at a second side thereof to a drive unit, to transmit power generated from the drive unit to the transfer unit; wherein:
   the waist bar is moved vertically in response to the vertical movement of the transfer unit;
   the transfer unit includes:
      a pair of carriers inserted respectively into ends of the waist bar to be moved vertically along with the waist bar, each end of the waist bar being coupled to the respective carrier;
      a pair of rails coupled to an inner door panel to correspond to positions of the carriers, the rails being configured to accommodate the carriers in a sliding manner;
      a connection bar connected to the carriers; and
      a rack gear having an upper end coupled to the connection bar, the rack gear being configured to convert rotational motion of the drive unit into linear motion to move the connection bar vertically;
   the power transmission unit includes:
      a belt gear connected to the drive unit via a belt to be rotated; and
      a pinion gear engaged with the belt gear and the rack gear, the pinion gear being rotated in a direction opposite to a rotation direction of the drive unit; and
   the belt gear includes:
      a first gear part connected to the belt; and
      a second gear part engaged with the pinion gear to rotate the pinion gear.

2. The driving device according to claim 1, wherein the drive unit is a window motor configured to move a door glass of the vehicle and the waist bar vertically in opposite directions.

3. The driving device according to claim 1, further comprising:
   a bracket coupled to the inner door panel, wherein the belt gear and the pinion gear are rotatably coupled to the bracket, and the rack gear is vertically movably coupled to the bracket.

\* \* \* \* \*